W. WHEELER.
Mode of Constructing Cards.
No. 24,684.
Patented July 5, 1859.
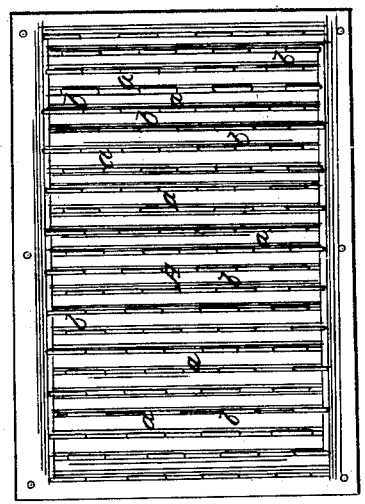
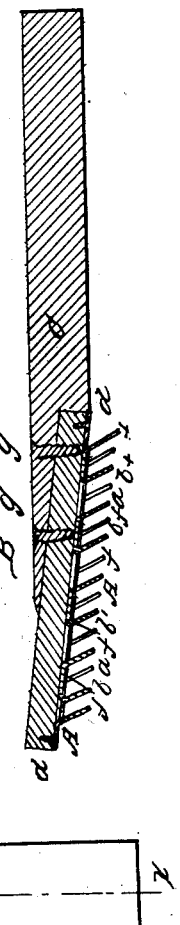
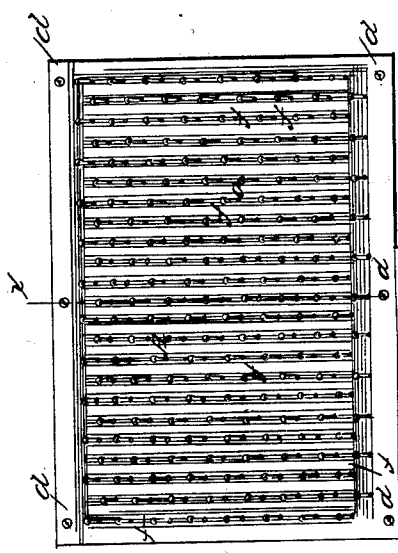

United States Patent Office.

W. WHEELER, OF WEST POULTNEY, VERMONT.

IMPROVEMENT IN MANUFACTURING MACHINE AND ANIMAL CARDS.

Specification forming part of Letters Patent No. 24,684, dated July 5, 1859.

*To all whom it may concern:*

Be it known that I, WILLIAM WHEELER, of West Poultney, in the county of Rutland and State of Vermont, have invented a new and improved mode of constructing cards of different kinds for carding and combing; and I do hereby declare that the following is a full and exact description thereof, reference being had to the accompanying drawings, making part of this specification—

Figure 1 being a front view of a hand-card constructed in my improved manner; Fig. 2, a back view of the metallic plate in which the card-teeth are secured; Fig. 3, a section in the plane indicated by the line $x\ x$, Fig. 1.

Like letters designate corresponding parts in all the figures.

Instead of leather, ordinarily used, I employ thin plates A of metal, in which to secure the teeth. Common "sheet-tin" or tinned iron for most purposes is very suitable. In the back of the plate grooves or long indentations $a\ a$ are formed, at the proper distances apart, for the reception of the teeth $f f$, said grooves being of sufficient size to receive the backs $b\ b$ of the teeth, which sink therein, partially or entirely, beneath the general surface of the plate. These grooves are situated in the direction in which the teeth incline, and in which the card is to act. In them, at distances equal to the distance apart required to place the teeth, perforations are made entirely through the plate of sufficient size to receive the teeth which are to be inserted therein. These holes should be punched from the back, so as to have their burrs on the front side of the plate, and they may be made at the same time and by the same dies as the grooves $a\ a$. The teeth $f f$ are formed in pairs, and have their inclinations in the same plane as their connecting backs or axes $b\ b$, as shown in Fig. 3, instead of being inclined in planes situated at right angles to their axes, as ordinary card-teeth are made, which thus require an additional bend, since as heretofore formed each tooth requires a bend from its axis, and another bend to give it the proper inclination. The teeth and plates being thus previously prepared, the former are inserted in the latter, and solder is then run along the grooves $a\ a$, thus firmly securing and embedding the axes of the teeth in said grooves. The solder also flows into the holes in the plates and in the burrs thereof, thereby firmly surrounding the bases of the teeth. I prefer the following mode of uniting the teeth to the back by the solder: After the teeth are properly arranged in the back, the whole is first dipped in a solution of sal-ammoniac or muriate of zinc, and then is immersed in a bath of the melted solder. This not only instantly solders all the teeth firmly in the grooves and perforations of the back at once, but completely coats the whole teeth and back therewith, and thus furnishes an excellent protection to the card from rust without further process. This mode of inserting the teeth, with their backs or axes in the same planes as their inclinations, and in the direction in which the cards act, saves one bend in each tooth, and secures a much greater firmness than when the strain against the teeth is exerted so as to turn them on their axes, and their long bearings in the grooves, together with embedding their bearings in solder, adds very great strength and additional firmness thereto. This construction becomes thus especially valuable for hand-cards for combing or currying animals and for carding hemp, for which uses great strength and rigidity of the teeth are desired. The mode of manufacture is also exceedingly expeditious and cheap.

For hand-cards, the plate A is secured to a wooden back, B, by screws or nails $d\ d$, as represented. The handle C is secured to the wooden back B by screws or nails $g\ g$.

For machine or revolving cards, the plates A A are formed in long, narrow, continuous strips of metal, grooved lengthwise, and after soldering the teeth therein they are wound or coiled around a wooden cylinder, and secured thereto by nails or otherwise. This method of making the cards, among the other advantages, obviates the great objection to the ordinary leather-back cards, especially for carding hemp, wherein the leather, becoming hard, dry, and brittle, soon decays and breaks off, so that such cards do not last long; but my metallic-back cards thus constructed are almost perfectly indestructible by time and exposure, and, being so much firmer and stronger than usual, will not wear out after many times as long use as any other cards heretofore constructed.

I disclaim the use of sheet metal or of solder in the construction of cards in any other manner or connection substantially different from that herein described, and I also disclaim the bending or arranging of the teeth in any particular manner irrespective of their relation to the other features of this invention; but

What I claim as my invention, and desire to secure by Letters Patent, is—

The construction and arrangement of the sheet-metal backs and wire teeth in combination, substantially as herein described, when united by solder applied thereto by immersion or otherwise.

The above specification of my improved mode of constructing cards signed by me this 1st day of May, 1858.

WILLIAM WHEELER.

Witnesses:
C. C. BEAMAN,
J. B. BEAMAN.